Patented May 31, 1932

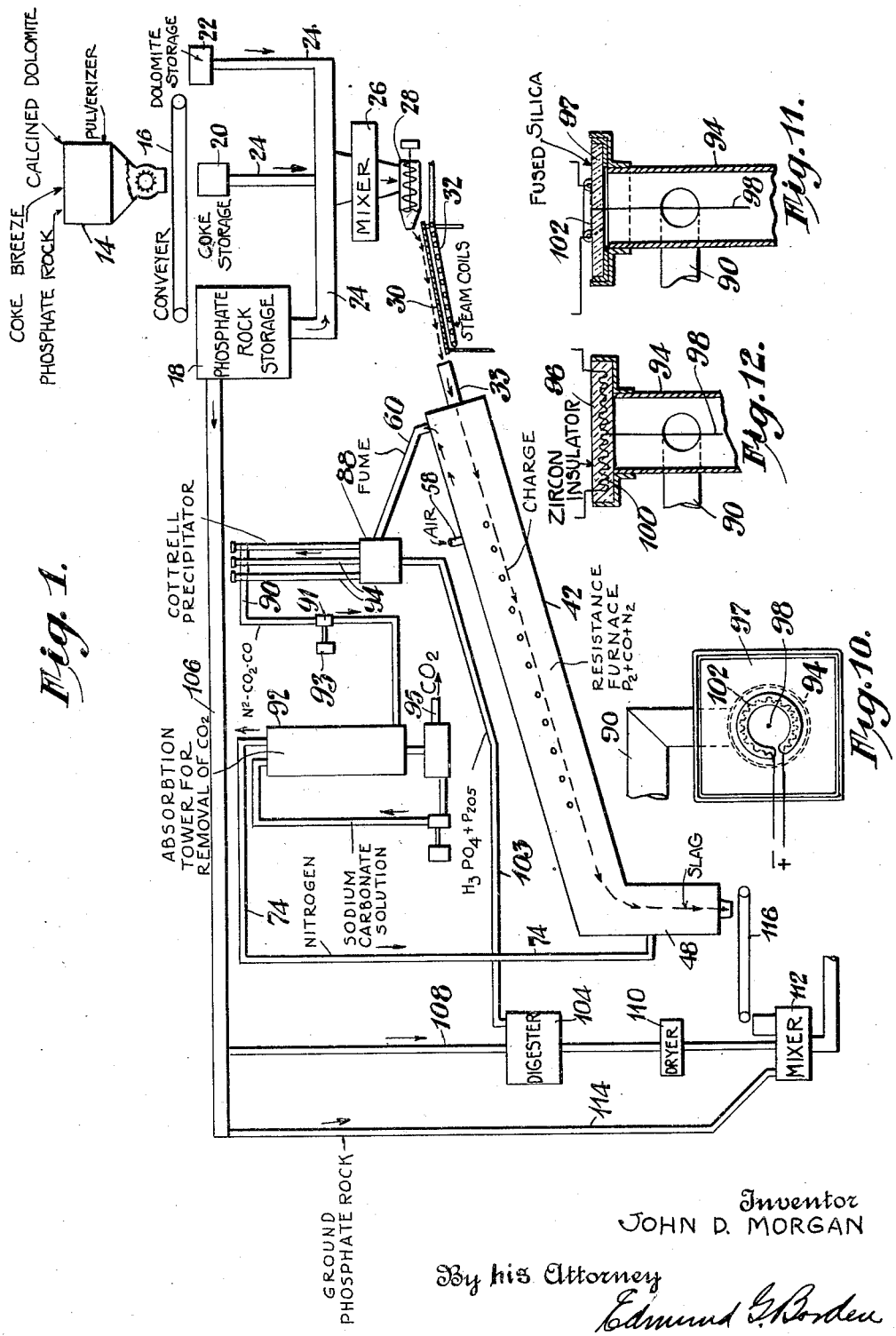

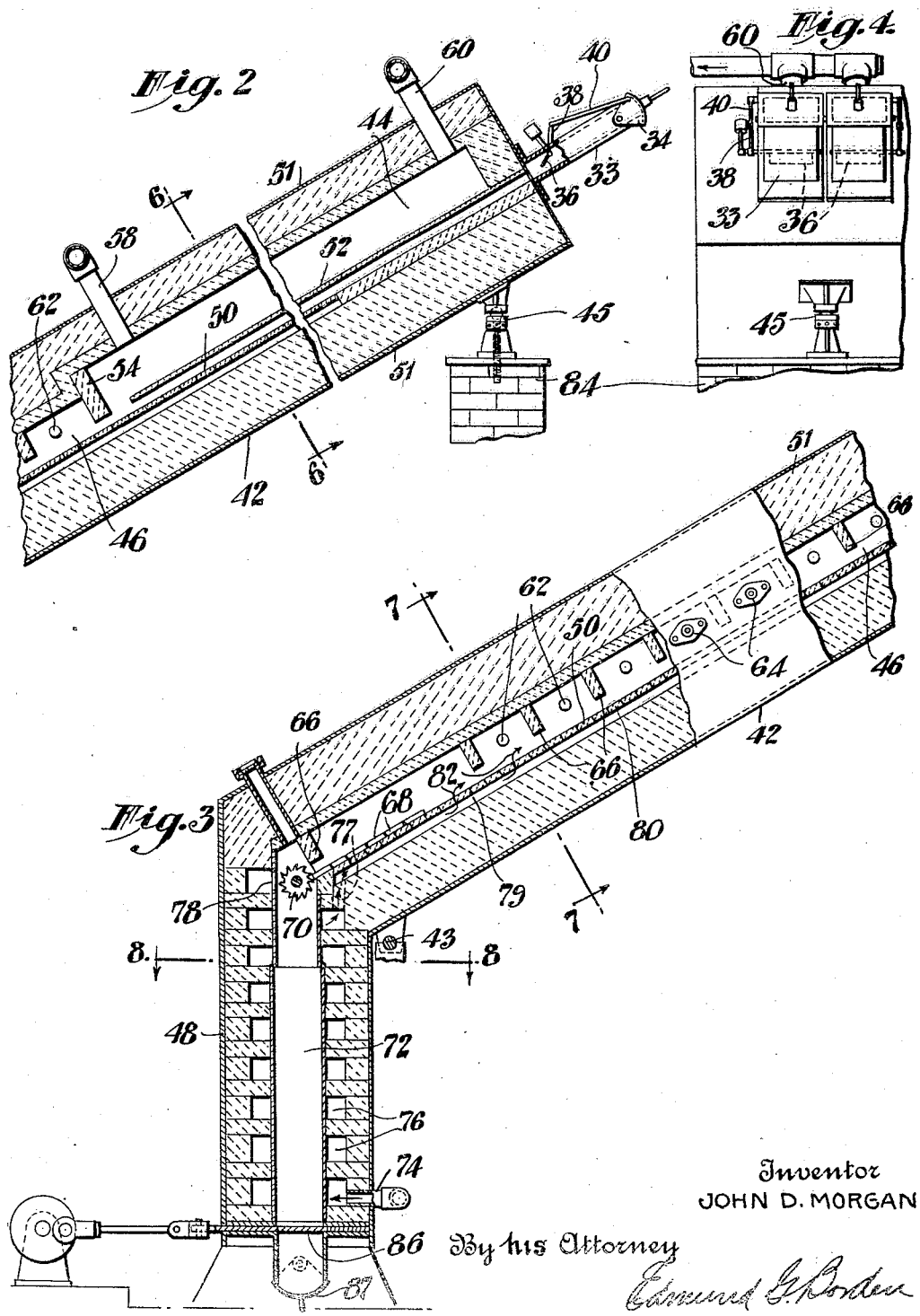

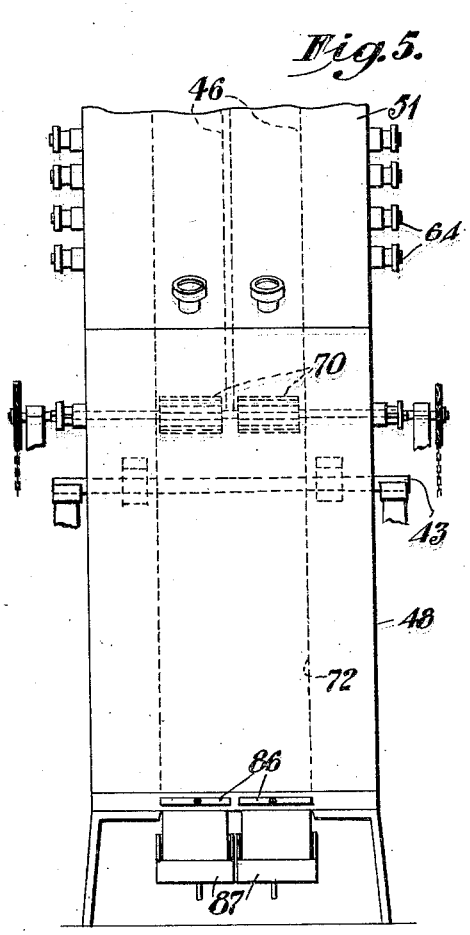
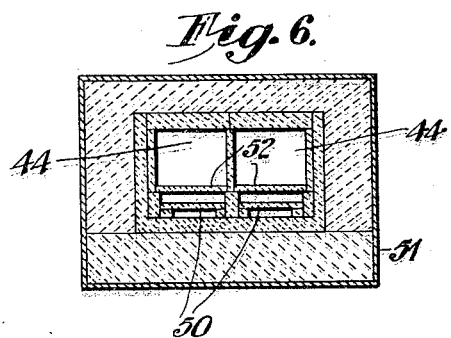
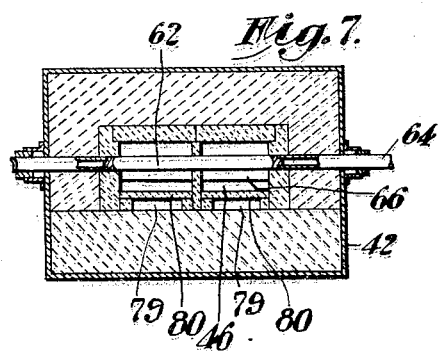
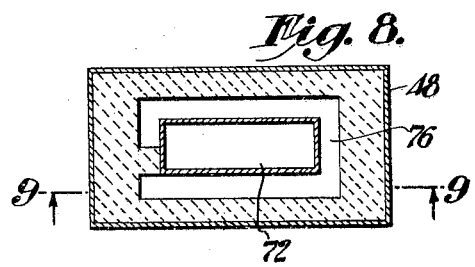
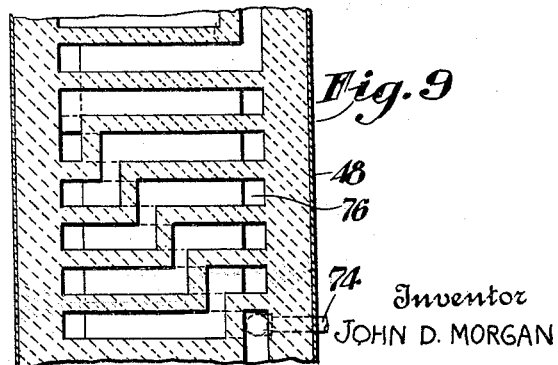

1,861,236

UNITED STATES PATENT OFFICE

JOHN D. MORGAN, OF MAPLEWOOD, NEW JERSEY, ASSIGNOR TO DOHERTY RESEARCH COMPANY, OF NEW YORK, N. Y., A CORPORATION OF DELAWARE

PROCESS FOR REDUCTION OF PHOSPHATE ROCK

Application filed May 11, 1928. Serial No. 276,840.

The present invention relates to the production of phosphorus or phosphate materials from native or other phosphates.

It has been proposed to reduce phosphates, such as native calcium phosphate or phosphate rock, by means of carbon in an electric or other furnace. Difficulty has been encountered, however, in obtaining good yields of phosphoric material in proportion to the phosphorus in the phosphate treated. It has been attempted to overcome this difficulty by introducing silica into the charge in addition to the carbon and by fusing the charge to produce a fluid slag. Another proposal for increasing the yield of phosphoric material has been to use approximately twice as much carbon as theoretically required for the reduction of the phosphorus in addition to silica, fusion being avoided in this case.

It is one of the principal objects of the present invention to provide a process of reducing phosphates which shall give good yields of phosphoric material at a reasonable price.

In the reduction of phosphates by carbon, phosphorus and carbon monoxide are formed as the primary products. These substances have a high heat value. If this heat value is recovered, obviously the cost of the phosphoric material is reduced. Difficulty has been encountered, however, in utilizing the heat of the primary products of the process.

Another object of the invention is to provide a simple and efficient method of utilizing the heat value of the primary products of the reduction of phosphates.

It has been found in practice that the electric furnace is the most convenient for the reduction of phosphates. However, if electricity is employed for heating the charge, the cost is high at the ordinary rates when using twenty-four hour electric power. If the process and apparatus therefore can be so arranged that the operation may be shut down during a part of each day as desired in order that the process load shall avoid the period of peak load on the electrical system and so obtain more favorable rates for electric power, the cost per pound of the phosphoric material produced by the process can be materially reduced. This involves, however, that the fixed charges per KW of the furnace shall be less than the fixed charges per KW of the power plant and line between the power plant and the furnace.

It is another of the objects of the present invention to provide an electric furnace so arranged and sufficiently low in first cost that it is technically and commercially feasible to shut it down during a portion of the day.

Further objects and advantages of the present invention will be evident to those skilled in the arts from the following description taken in connection with the accompanying drawings in which:

Fig. 1 is a diagrammatic view of an apparatus according to the present invention and adapted to carry out the process according to the present invention;

Figs. 2 and 3 are elevations, partly in section, and parts being broken away of the upper and lower ends of an electric furnace according to the present invention;

Fig. 4 is an elevation of the furnace taken from the right of Fig. 2;

Fig. 5 is an end view of the furnace taken from the left of Fig. 3;

Fig. 6 is a section of the furnace taken on the line 6—6 of Fig. 2 looking in the direction of the arrows;

Fig. 7 is a section of the furnace taken on the line 7—7 of Fig. 3 looking in the direction of the arrows;

Fig. 8 is a section of the furnace taken on the line 8—8 of Fig. 3 looking in the direction of the arrows;

Fig. 9 is a section taken on the line 9—9 of Fig. 8 looking in the direction of the arrows;

Fig. 10 is a plan view of one section of a Cottrell precipitator such as may be used in connection with the present invention and which is indicated diagrammatically in Fig. 1.

Fig. 11 is a vertical sectional view of the upper end of the precipitator section illustrated in Fig. 10 as it appears when equipped with one type of insulator according to the present invention;

Fig. 12 is a view similar to Fig. 11 illustrating the upper end of the precipitator section as equipped with another form of insulator according to the present invention.

In the process according to the present invention, a phosphate preferably native rock phosphate (tricalcium phosphate), is prepared for reduction with carbon by being pulverized and mixed with pulverized coke breeze, or other form of carbon and a binder, preferably calcined dolomite, although the invention is not limited to a particular type of binder. The mixture is then formed into briquets to be heated in a reduction furnace. The pulverized phosphate, coke and dolomite are mixed preferably in the proportions of 75 parts of phosphate rock to 25 parts of carbon and 10 parts of calcined dolomite by weight. The proportion of carbon just stated is approximately that theoretically required for the complete reduction of phosphorus in tricalcium phosphate, it being possible according to the present invention to obtain substantially complete reduction of the phosphorus and a high yield of phosphatic material when using only the theoretical amount of carbon. It has been found that potash bearing minerals are reduced and the potash liberated under the conditions used to reduce the phosphates. Felspar or other potash bearing minerals may be added to the charge and, in this case, the potash appears in the recovered products in combination with phosphoric acid. When a potash-bearing mineral is added to the charge, it is preferred also to increase the amount of carbon above that required to reduce the phosphate. The amount of dolomite mentioned is merely that sufficient to hold the parts of the charge together. The charge is formed preferably in the proportions just stated and is thoroughly mixed, after which water is added to make the mass somewhat plastic. The mixture is then extruded or pressed into briquets or plates, which preferably are of rectangular form. It is preferable that the thickness of the plates be not greater than one half inch. If a ribbed or grooved section is used, it is preferred that no point within the interior of a given plate or briquet be at a greater distance than one fourth inch from some point on the surface of the briquet. This is for the reason that experiment has shown that the rate at which the phosphorus is driven off from a briquet at a given temperature decreases very rapidly as the thickness is increased above one half inch. In fact, in a given experiment, when operating with plates one-fourth inch thick, 80% of the phosphorus in the plates was volatilized in fifteen minutes, whereas, with plates one half inch thick over 70% was volatilized after heating for one half hour. When the thickness of the plates was increased to one inch, over one hour was required to obtain 70% volatilization. Therefore, the plates should be as thin as possible consistent with the strength necessary to permit them being conveniently introduced into and handled in the furnace.

The briquets or plates, after being formed, are passed through a furnace having an inclined hearth and are preferably preheated in the entering end of the furnace by combustion of phosphorus and gases developed in the reaction zone of the furnace. The charge, after leaving the preheater zone, passes down into the reaction zone where it is heated to a somewhat higher temperature by radiation from electrically heated resistance elements. In the reaction zone, phosphorus is evolved from the charge and at the same time, considerable quantities of carbon monoxide and small quantities of hydrogen are formed. Preferably, according to the present invention, the charge is heated to approximately 2400° F. by combustion of the phosphorus and carbon monoxide while the charge is in the preheater zone and the temperature is raised preferably to about 2550° F. in the reaction zone of the furnace. It is important that the charge shall not fuse while passing through the furnace and its composition is determined in part by this consideration. If the charge fuses it becomes more difficult to prevent the charge from sticking to the hearth and it is difficult also to regulate the movement of the charge along the hearth.

The phosphorus and carbon monoxide are burned in the preheating zone by atmospheric oxygen admitted for this purpose, thereby converting the phosphorus into $P_2O_5$ (phosphoric anhydride) and the CO to $CO_2$. If desired, ammonia may be admitted to the preheater zone to increase the amount of heat developed in this zone and to convert some of the phosphoric acid into ammonium phosphate, there always being some water present so that some of the phosphoric anhydride is converted into phosphoric acid. If desired, further, also, ammonia-water may be admitted to the preheating zone to further convert the $P_2O_5$ into ammonium phosphate. Moreover, when felspar or other source of potash is added to the charge, more or less of the $P_2O_5$ is converted to acid potassium-phosphate or to other salt of phosphoric acid.

It has been found very desirable from the commercial standpoint to circulate a neutral gas, preferably hot nitrogen, through the reaction zone in close contact with the charge undergoing reduction. If no nitrogen, or like gas, is used to carry off the phosphorus, a thin white glaze forms on the charge after about 25% of the phosphorus has been driven off and it then requires a temperature of nearly 3000° F. to drive off the phosphorus in the charge. Without a current of neutral gas in contact with the charge, it is practically impossible to obtain high volatilization rates. For example, in a furnace run without nitrogen, a yield of but 28% was obtained and under identical conditions, but with nitrogen supplied to the furnace, the yield jumped to 80%. I do not limit myself to any particular theory as to the action of the current of neutral gas, but believe its net effect is principally due to the following: it reduces the partial pressure of phosphorus in the atmosphere surrounding the briquets against which the phosphorus vapor must distill; it excludes oxygen and water vapor from the reaction zone, and it prevents secondary reactions between the spent material in the briquet and the phosphorus vapor. One important result of the nitrogen or neutral gas is that it permits the use of a charge of basic character. It has been the experience of prior workers in the field of thermal reduction of phosphates that an acid charge is preferable if not necessary. When using the nitrogen current in contact with the charge, the briquets can be made of phosphate, carbon and a basic binder without further additions. The normal charge is therefore of the optimum proportions for the volatilization of potash when it is desired to produce potash along with phosphorus.

The fume passing from the preheating zone consisting principally of $P_2O_5$, $H_3PO_4$, $K_2(NH_4)PO_4$, together with $N_2$ and $CO_2$ gases and other miscellaneous constituents is then treated to separate the normally solid mineral products from the fixed gases. Preferably this is done in a Cottrell precipitator. The gases, after having been stripped of the normally solid ingredients, are then washed to remove the carbon dioxide and the nitrogen returned to the furnace to assist in carrying off the phosphorus in the charge.

The process according to the present invention, as described above, is preferably carried out in apparatus such as that illustrated in the drawings. Further details of the process according to the present invention, however, will be apparent from the following description of the apparatus:

Referring to the drawings, 14 is a pulverizer which may be used alternately for grinding phosphate rock, coke breeze and calcined dolomite. Pulverizer 14 delivers ground material to a conveyor 16 by which it may be delivered as desired to bins 18, 20 and 22 for phosphate rock, coke or dolomite respectively. In making up the furnace charge, rock, coke and dolomite are taken from the bins 18, 20 and 22 in the proportions above stated and delivered by conduits 24, 24 to a mixer 26 in which they are thoroughly mixed with each other and with sufficient water so as to make the mass somewhat plastic. The mixture is then delivered to the press 28 and extruded or pressed into plates or briquets. The plates from press 28 pass onto an inclined table 30 which is heated by steam coils 32 and the briquets thereby dried and heated, preferably to 250° F. so as to withstand further handling. From the table 30 the briquets are fed either manually or automatically into a chamber 33 having gates or valves 34, 36 (Figs. 2 and 4) at its upper end. The gates 34, 36 are connected by levers 38 and 40 so that one of the gates is always closed. The gases therefore are prevented from escaping from the furnace when briquets are fed into the furnace through the chamber 33.

The furnace illustrated in the drawings is indicated generally by reference character 42. Furnace 42 includes a heat recuperating zone or chamber 48. The portion of furnace 42 which includes the zones 44 and 46 is set at an angle to the horizontal so that its hearth 50 slopes downwardly from the feeding chamber 33 to the vertical recuperator section 48. The furnace 42 has an outer steel shell 51 and it is preferred that the inclination of the hearth 50 be adjustable. As illustrated the hearth 50 may be adjusted about a shaft 43. Shaft 43 is in the region of the lower end of hearth 50 and a screw-jack 45 is provided arranged to bear against shell 51 near its upper end to swing the shell 51 about shaft 43. The hearth 50 of furnace 42 extends in an unbroken plane throughout the zones 44 and 46. The upper surface of hearth 50 is in the same plane as the floor of the inlet chamber 33. The briquets forming the charge can therefore progress along the surface of the hearth in a uniform manner. At the upper end of hearth 50, the furnace forms a preheating chamber 44 and within the zone or chamber 44 the hearth 50 is covered by a muffle 52 of refractory material. Muffle 52 is spaced from the hearth sufficiently to permit the briquets to pass beneath the muffle, but the muffle is close enough to the hearth so that when the muffle becomes incandescent the charge will be strongly heated by radiation from the muffle. The chamber 44 and muffle 52 are heated during the operation of the furnace by the combustion in chamber 44 of phosphorus fumes and carbon monoxide gas produced in the reduction of the charge in zone 46. The fumes and gas pass from the zone 46 into zone 44 around the lower edge of the refractory block 54 which forms the lower end of the chamber 44, but which is spaced from the hearth 50 to permit the gases to pass. An opening 56 is formed in muffle 52 to provide an opening into the upper part of chamber 44 above muffle 52 for fumes and gas which have passed upward around the lower end of block 54. Air for combustion of phosphorus and gas in the chamber 44 is admitted thereto through pipe 58. Ammonia water or other substance for reacting with the products of combustion in chamber 44 may also be admitted through pipe 58. The fume and gaseous products of combustion may be discharged from chamber 44 through the pipe 60. Preferably the conditions are maintained such in chamber 44 that the charge is heated under muffle 52 to a temperature of above 2400° F. before passing into the reduction zone 46. Considerable reduction may occur before the charge passes from under muffle 52.

After passing the block 54 the charge enters the reduction zone 46. Within chamber 46 the charge is subjected to the radiant heat of a number of incandescent resistors 62, 62. As illustrated, resistors 62 preferably are arranged above and parallel to hearth 50, but they may be below the hearth. Resistors 62 extend transversely of the furnace through the side walls thereof, where electrical connections are provided for supplying current to heat the resistors 62, as indicated at 64, 64 (Fig. 2). Sufficient current is supplied to the resistors 62 so that preferably the charge in zone 46 is heated to a temperature of approximately 2550° F. As illustrated, the resistors 62 are set above the hearth 50 a sufficient distance so that the hearth or a thin block or briquet lying thereon will be subjected to substantially uniform heating as it progresses along the hearth. However, refractory blocks 66, 66 preferably are placed one on each side of a given resistor so that gas, such as nitrogen, passing up through the furnace will be forced to pass in close contact with the charge on the hearth.

The charge advances through the furnace in the form of thin plates or briquets 68 some of which are illustrated in position in the furnace at the lower end of Fig. 3. At the lower end of hearth 50, the charge, by this time substantially deprived of its phosphorus content, comes in contact with a cutter or breaking wheel 70 by which the briquets are broken up and fall into a vertical shaft 72 of the recuperator section 48 of the furnace.

In the shaft 72, the spent fragments of the charge, composed mostly of lime and magnesia, are cooled by a current of nitrogen entering the section 48 through pipe 74. Within the section 48 the nitrogen passes through flues 76, 76 which surround the shaft 72 and conduct the nitrogen spirally upward to a port 78 through which the nitrogen discharges against the breaker wheel 70 and then passes into the reduction zone 46 of the furnace. While passing through the flues 76 the nitrogen recovers heat from the spent fragments of the charge thereby decreasing the amount of heat lost when the spent fragments are removed from the furnace and therefore increasing the efficiency of the process. The nitrogen, however, is not heated to the full temperature of the charge at the lower end of the zone 46 and therefore serves to cool the wheel 70 which is in contact with the spent briquets when at practically their maximum temperature. It is preferred to pass some of the nitrogen into contact with the bottoms of briquets on hearth 50. For this purpose, some of the nitrogen is passed from the upper end of flue 76 through passage 77, appearing in dotted lines in Fig. 3, and into flues 79, 79 beneath hearth 50. Individual blocks 80, 80 forming hearth 50, are laid somewhat loosely so that the nitrogen gas escapes from flues 79 upward through the joints in the hearth and against the under surface of the charge on hearth 50. The path of the nitrogen through the hearth 50 is indicated by arrows 82, 82 on Fig. 3. The rate at which the briquets pass through the furnace depends in part on the inclination of the furnace and in part on the speed of the wheel 70. The speed of the wheel 70 can be readily varied and, according to the present invention, the furnace 42 is so constructed that its inclination may be varied as desired within certain limits by means of a jack 45 previously mentioned and set in the pier 84 on which the furnace is supported at its upper end. The fragments of spent briquets are discharged from the zone 48 at its bottom through suitable gates 86 and 88.

The nitrogen passes up through the furnace in close contact with the charge and assists in carrying off the phosphorus from the charge as it is reduced. It passes out of the furnace with the fume and products of combustion through the pipe 60. After the fume has been removed from the gas stream, the gases are preferably treated for removal of carbon dioxide and other gases which would not be neutral in the furnace and the nitrogen and other neutral gas recirculated through the furnace. Means for carrying out the circulation of nitrogen as just described includes, in addition to the pipe 60, an apparatus for stripping the fumes from the fixed gases. For this purpose, pipe 60 delivers the fume and gases into a Cottrell precipitator 88. It will be understood that the present invention is not limited to the use of a Cottrell apparatus or other electrical precipitator for recovering the mineral elements from the gases. In the usual operation of the Cottrell precipitator, the gases are commonly discharged into the atmosphere after the fume or mist has been removed therefrom. According to the present invention, however, the Cottrell precipitator is closed at its top and the stripped gases pass out of the precipitator through a pipe 90 by which they are conducted to an absorption tower 92 for the removal of carbon dioxide. As illustrated in the drawings, the apparatus for removing carbon dioxide is one in common use for this purpose in the gas industry and employs sodium carbonate for absorbing the carbon dioxide. The carbon dioxide is removed from the apparatus through pipe 95 in the form of acid sodium carbonate. The present invention, however, is not limited to any particular apparatus or process for separating the carbon dioxide from the nitrogen and other neutral gases. From the absorber 92, the nitrogen is returned to the bottom of the furnace by the pipe 74. It has been found in operating a furnace of 600 kw. capacity that a suitable rate of flow of nitrogen through the furnace is approximately 21000 cubic feet of nitrogen per hour. In order to circulate the nitrogen and to move the fume and other gases as above described, a fan or gas pump must be provided. As illustrated, a gas pump 91 is connected into pipe 90 to move the gases and fumes through the apparatus. Pump 91 is driven by a direct connected motor 93.

Reference has been made to operating the Cottrell apparatus so that the gases are not discharged directly therefrom into the atmosphere. In order to permit this method of operation, the upper ends of the precipitating conduits 94 of the Cottrell apparatus are closed by an insulator 96 supporting the high temperature conductor 98. Difficulty was encountered when it was first attempted to operate the Cottrell apparatus in this manner. It was found that the fume consisting of $P_2O_5$ and other substances would condense on the inner surface and short circuit the apparatus. It has been found possible, however, to heat the insulating plate 96 sufficiently to prevent the collection of fume on its inner surface, thereby preventing difficulty from short circuiting. The conductor 98 is subjected to a considerable electrical tension and difficulty was found in obtaining insulating materials which would withstand the combination of high temperature and high voltage in a highly acid atmosphere. Two materials, however, have been found which will withstand the conditions. One of these is zircon (zirconium silicate) and the other is fused silica. If zircon is used, as in the insulator 96, a heating coil 100 may be embedded directly in the body of the insulator at the time it is molded for firing. The zircon is preferably bonded with a small amount of chromium hydroxide. The method of bonding the zircon, however, forms no part of the present invention and is not claimed herein. If the insulator at the upper end of the section 94 is of fused silica, the heating coil cannot be incorporated into the body of the insulator. In this case, the insulator takes the form of a plate 97 having a heating coil 102 cemented to its outer surface. In actual practice, it has been found that the insulator 96 or 97 should be maintained at or near 1200° F. This temperature is sufficient to prevent condensation of any $P_2O_5$ fog on the insulator. Prior to the discovery of an insulator capable of operating at approximately this temperature, it was impossible to hold more than 45,000 volts between the wire 98 and the conduit 94. After the heated insulator had been installed, it was found possible to maintain as high as 85,000 volts on the precipitator. However, it is not necessary to operate at so high a voltage as 85,000. The proper voltage to hold on the wire depends to a considerable degree on the temperature of the gases being treated. The higher the velocity and temperature of the gases the higher the voltage required on the Cottrell apparatus to obtain good precipitation. In the apparatus in question, it was found difficult to obtain good precipitation when the gases reached a temperature of 1200° F. and it is preferred to operate with the gases in the Cottrell apparatus at a temperature near to but below 1000° F. Within this range of temperature, a voltage of 55000 gives good precipitation.

The mixture of $P_2O_5$, $H_3PO_4$ and similar substances precipitated in the Cottrell apparatus 88 may be utilized in various ways within the present invention. If desired, a highly concentrated $H_3PO_4$ may be prepared, or ammonium phosphate, potassium phosphate, or ammonium potassium phosphate may be manufactured. A plan of utilizing the precipitate from the Cottrell apparatus as illustrated in the drawings involves using the phosphoric acid from the Cottrell precipitator to leach out phosphate rock and thus produce a highly concentrated, double, superacid phosphate which may be sold as such. If this plan of operation is followed, the $H_3PO_4$ and $P_2O_5$ are taken from the Cottrell apparatus through a pipe such as pipe 103 and delivered to a digester 104 which is connected by a suitable conveyor indicated diagrammatically in Fig. 1 by reference characters 106 and 108 so as to receive ground phosphate rock from bin 18. The product formed in digester 104 is then discharged into a drier 110. If desired, moreover, the product from drier 110 may be mixed with additional amounts of ground phosphate rock and/or slag in a mixer 112, the rock and slag being delivered to the final mixer by conveyors 106 and 114 and by conveyor 116.

It will be understood that, while I have disclosed a specific method and apparatus, I do not limit myself to details of the foregoing disclosure, it being the intention to claim the novelty embodied in the herein described process and apparatus as broadly as the prior art permits.

It has been found that there is difficulty in feeding the charge material composed of phosphate and carbon along the hearth, unless the composition of the hearth is of a certain type. It has been found that a hearth formed, of bonded carbon or graphite or of a graded carborundum aggregate and finely ground magnesia in the proportions by weight of 80% of carborundum to 20% of magnesia is very satisfactory. The later type of material for the hearth, however, forms no part of the present invention and is not claimed herein.

Having thus described my invention, I claim:

1. The process of reducing a phosphate and potash bearing material comprising mixing the phosphate and potash bearing material with carbon and a bond containing magnesia and lime, briqueting the mixture and heating the briquets to above 2500° F. in a current of neutral gas.

2. The process of reducing a phosphate comprising mixing the phosphate with carbon and a bond containing magnesia and lime, briqueting the mixture and heating the briquets to above 2500° F. in a current of neutral gas.

3. The process of reducing a phosphate comprising mixing the phosphate with carbon and a bond, forming the mixture into briquets, arranging the briquets in a single layer and progressively heating said layer to drive off phosphorus containing fumes.

4. The process of reducing a phosphate comprising mixing the phosphate with carbon and a bond, forming the mixture into thin flat briquets, arranging the briquets in a single layer and passing the same by gravity through a heating zone, and heating the briquets therein to a temperature sufficient to drive off phosphorus containing fumes.

In testimony whereof I affix my signature.

JOHN D. MORGAN.